| United States Patent [19] | [11] Patent Number: 4,812,363 |
| Bell et al. | [45] Date of Patent: Mar. 14, 1989 |

[54] POLYMERIC COUPLING AGENT

[76] Inventors: James P. Bell, 34 Farmstead Rd., Storrs, Conn. 06268; Randall G. Schmidt, 1500 Illinois Dr., MIdland, Mich. 48640

[21] Appl. No.: 113,825

[22] Filed: Oct. 26, 1987

[51] Int. Cl.$^4$ ............................................. B32B 7/04
[52] U.S. Cl. ................................. 428/420; 156/307.3; 156/327; 156/334; 427/400; 427/410; 428/413; 525/61
[58] Field of Search ................ 156/327, 334, 307.3; 427/400, 410; 428/420, 413; 525/61

[56] References Cited

U.S. PATENT DOCUMENTS 2,443,923  6/1948  Mortenson ........................ 525/61
3,979,549  9/1976  Wilkinson ......................... 428/420
4,376,797  3/1983  Howse ............................. 427/410

*Primary Examiner*—John J. Gallagher
*Attorney, Agent, or Firm*—Fishman, Dionne & Cantor

[57] ABSTRACT

A coupling agent for chemically linking metal substrates to thermoset polymers is composed of a hydrophobic polymer backbone having functional groups attached thereto at spaced intervals, the functional groups having the ability to form chemical bonds to both the metal substrate and the thermosetting polymeric resin. In a preferred embodiment, the hydrophobic polymeric coupling agent comprises mercaptoester functional groups placed along a strong, hydrophobic polymeric backbone. This polymeric backbone preferably comprises polyethylene resulting in an ethylene mercaptoester (EME) copolymer.

22 Claims, 3 Drawing Sheets

POLYMERIC COUPLING AGENT

BACKGROUND OF THE INVENTION

This invention relates to a method of improving the adhesion between metal substrates and thermoset resins using a polymeric coupling agent. More particularly, this invention relates to a method of improving the adhesion between metal substrates (e.g. steel and copper) and thermoset resins (e.g. epoxy) utilizing a polymer composed of a strong, hydrophobic polymer backbone having functional groups attached thereto at spaced intervals that will chemically bond to both the metal and thermoset resin. This invention also relates to a preferred method of making the novel polymeric coupling agent.

It is well known in the adhesive bonding art that water is extremely detrimental to metal/thermoset adhesion systems. It is believed that diffusion of water into the interfacial region between the polymer and metal will reduce the strength of the metal/polymer bond for several reasons. For example, since water molecules are very strong hydrogen bonding agents, they can readily break non-covalent bonds between the metal and polymer and form new hydrogen bonds with the oxide surface of the metal. A weak water layer results, reducing the strength of the entire adhesion system. Water can also weaken the interfacial region by initiating corrosion and/or hydration reactions with the base metal, oxides or the polymer itself.

Epoxy resins are well known examples of thermosetting polymeric material whose bonds with metals are adversely affected by water. Thus, while an epoxy resin will normally exhibit a high strength and strong bond to metal surfaces such as steel, the integrity of the epoxy/metal bond is significantly reduced when exposed to high humidity or water.

Attempts have been made to improve the bonding between polymers and metals (particularly the adverse effect of water on the bond) by the use of intermediate compounds which are designed to form chemical bonds with both the metal substrate and the polymeric resin. In essence, these intermediate compounds chemically link or bridge the polymer to the metal substrates. These linking compositions have consisted of various low molecular weight coupling agents which have the ability to form chemical bonds across the metal/polymer interface. U.S. Pat. Nos. 4,448,847 and 4,428,987 to Bell et al, the contents of which are fully incorporated herein by reference, both disclose the use of such low molecular weight coupling agents. U.S. Pat. No. 4,448,847 describes a method of improving the adhesion of epoxy resins to steel substrates using either a beta-diketone or mercaptoester coupling agent. U.S. Pat. No. 4,428,987 describes a method of improving the adhesion of epoxy resins to copper substrates using benzotriazole, benzothiazole and related compounds as the coupling agent.

While the low molecular weight coupling agent of the type described hereinabove have improved the durability of polymer/metal bonds, these compositions nevertheless suffer from certain deficiencies and disadvantages. For example, in order to achieve the greatest effect, the prior art coupling agents should be coated onto the metal substrate in a single layer. However, single layer thicknesses are extremely difficult to produce. As a consequence, bond failure can result between layers of the coupling agent itself thereby dramatically reducing the bond strength of the overall polymer/metal bond. In addition, low molecular weight coupling agents are normally quite water permeable. Therefore, their presence can actually promote the infiltration of destructive water molecules into the interfacial region.

Low molecular weight coupling agents also provide little help in alleviating internal stresses in metal/thermoset adhesion systems. It will be appreciated that significant stresses can develop during post cure cooling of a thermoset such as an epoxy, primarily due to the thermal expansion coefficient mismatch between the metal and the polymer. This interfacial stress is believed to be the cause of failure in a number of adhesion systems.

SUMMARY OF THE INVENTION

The above-discussed and other problems and deficiencies of the prior art are overcome or alleviated by the method of the present invention wherein the adhesion between metals and thermoset polymers is improved using a polymeric coupling agent. In accordance with the present invention, a coupling agent for chemically linking metal substrates to thermoset polymers is composed of a hydrophobic polymer backbone having functional groups attached thereto at spaced intervals, the functional groups having the ability to form chemical bonds to both the metal substrate and the thermoset polymeric resin. The polymer backbone preferably comprises an aliphatic or aromatic hydrocarbon backbone polymer since these types of polymers exhibit the necessary and requisite hydrophobicity.

In a preferred embodiment, the polymeric coupling agent of the present invention comprises mercaptoester functional groups placed along a strong, hydrophobic polymeric backbone. This polymeric backbone preferably comprises polyethylene resulting in an ethylene mercaptoester (EME) copolymer.

The use of a hydrophobic polymeric coupling agent provides many features and advantages over prior art low molecular weight coupling agents. For example, the presence of the polymer backbone gives the interfacial region greater physical strength, even though more than a monolayer of coupling agent is present. The polymeric coupling agent also permits relief of interfacial stresses caused by mismatch of properties (such as thermal expansion coefficient) at the interface, because of the improved viscoelastic properties of high molecular weight polymer coupling agents relative to the prior art low molecular weight coupling agents. Also, the hydrophobicity of the polymeric backbone provides greatly improved resistance of the adhesive bond to the deleterious effects of water.

The above-discussed and other features and advantages of the present invention will be appreciated and understood by those skilled in the art from the following detailed description and drawings.

DESCRIPTION OF THE PREFERRED EMBODIMENT

Figure 1:
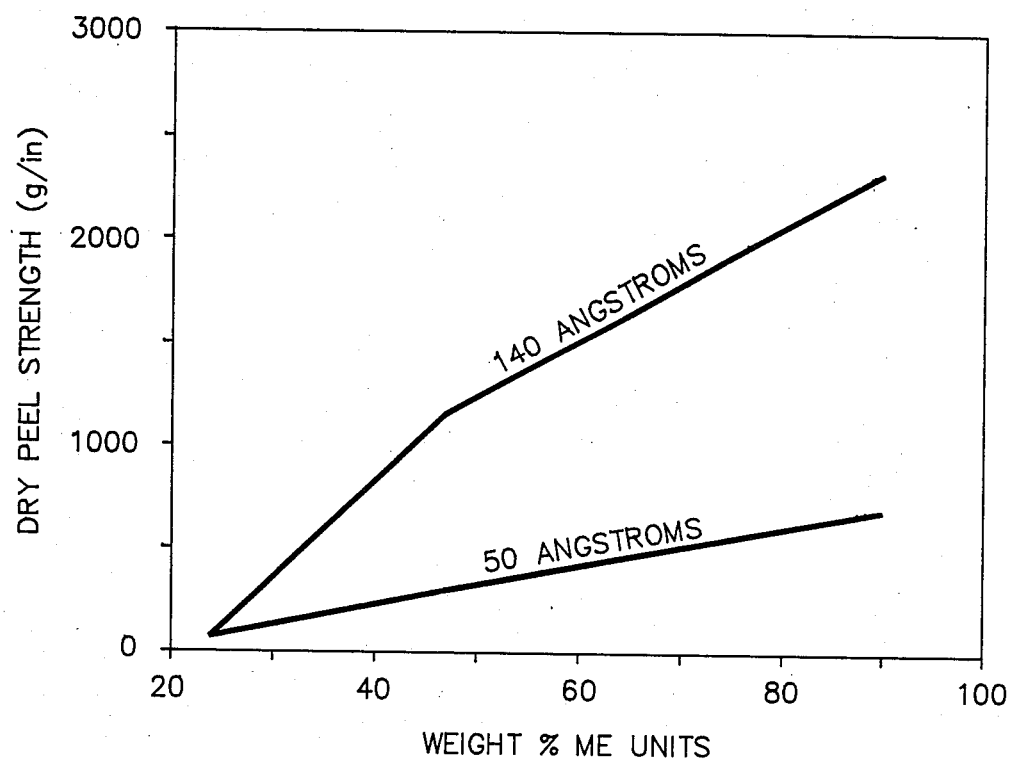
FIG. 1 is a graph showing peel strength versus wt. % mercaptoester units for coupling agent thicknesses of 50 and 140 Angstroms.

The present invention comprises a coupling agent for forming chemical bonds across a metal/thermoset interface. This coupling agent comprises a hydrophobic polymeric backbone having functional groups at spaced locations along the polymer backbone which have the ability to chemically bond to the metal substrate and the thermoset polymer. While not limited thereto in its utility, the polymeric coupling agent of the present invention is particularly well suited for improving the adhesion of thermoset resins, particularly epoxy resins, to steel and/or copper metal substrates.

In accordance with the present invention, the polymeric backbone of the coupling agent may comprise any suitably strong, hydrophobic polymers. Because of their strength and hydrophobicity, suitable polymeric backbones include any substantially aliphatic or aromatic hydrocarbon backbone polymer. Examples include, but are not limited to polyethylene and simple derivatives thereof and polypropylene. The functional groups attached at spaced locations to the polymer backbone must have the ability to chemically bond to a metal substrate and to the intended polymer. Examples of suitable functional groups which may be grafted onto the hydrophobic polymer backbone include, but are not limited to beta-diketones, mercaptoesters, benzotriazole, benzothiazole, primary amines and carboxylic acids and any combination of these functional groups.

The polymeric nature of the novel coupling agents in accordance with the present invention provide significant advantages over the more common low molecular weight coupling agents such as those disclosed in U.S. Pat. Nos. 4,448,847 and 4,428,987. Unlike low molecular weight compounds, polymeric coupling agents are capable of bearing a load, which make the effectiveness of the coupling agents much less sensitive to the thickness of the coupling agent layer. In addition, low molecular weight coupling agents are normally quite water permeable. Therefore, their presence can actually promote the infiltration of destructive water molecules into the interfacial region. Since the polymeric coupling agent of the present invention can be tailored to consist of reactive hydrophilic groups on a hydrophobic hydrocarbon backbone, their use will reduce the water permeability of the interphase.

Moreover, unlike the low molecular weight compounds, the viscoelastic properties of the polymeric coupling agents of the present invention enable them to help relieve internal stresses in metal/thermoset adhesion systems. This is advantageous since significant stresses can develop during the post-cure cooling of the thermoset, primarily due to the thermal expansion coefficient mismatch between the metal and the polymer. The crosslinked structure and the elevated glass transition temperatures of most thermosets limit their stress relaxation ability. For example, epoxy resins have thermal expansion coefficients which exceed that of steel by an order of magnitude. Hence, a large degree of stress can develop. Interfacial stress has been cited as the cause of failure in a number of adhesion systems.

A preferred polymeric coupling agent particularly well suited for improving the bond adhesion between epoxy resins and steel or copper substrates is a copolymer of ethylene and mercaptoester having the general formula:

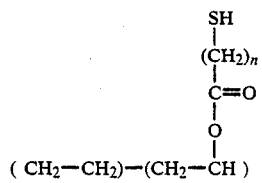

where n=1, 2 or 3. Reference is made to U.S. Pat. No. 4,448,847 for a more detailed description of the mercaptoester group suitable for use in this invention. Also, reference should be made to U.S. Pat. No. 4,448,847 for a thorough discussion of preferred epoxy resin and coupling agent formulations. It will be appreciated that the mercaptoester group has been found to chemically bond with both steel and copper substrates (in addition to its ability to bond to epoxy resin).

Ethylene mercaptoester (EME) copolymers are preferably prepared starting from ethylene vinyl acetate (EVA) copolymers (supplied by DuPont (Elvax) MW: 70,000–90,000) in a two step reaction with ethylene vinyl alcohol (EVAlc) serving as the intermediate as shown below. In the first step, EVA (14–50% vinylacetate) is saponified using sodium methoxide in a refluxing methanol/xylenes solution to produce the EVAlc intermediate. Once washed and dried, the EVAlc copolymer is reacted at 100° C. for 1 hr. with mercaptoacetic acid in the presence of an acid catalyst (toluene sulfonic acid monohydrate) yielding the EME product. The second step of the reaction is driven to the desired product by removing the water byproduct using a Dean-Stark trap.

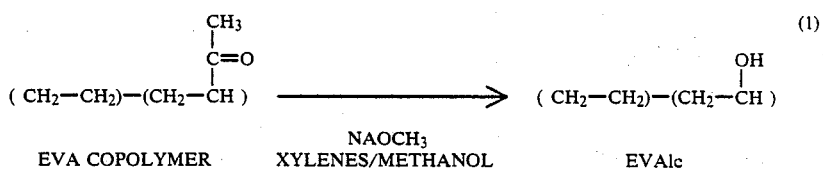

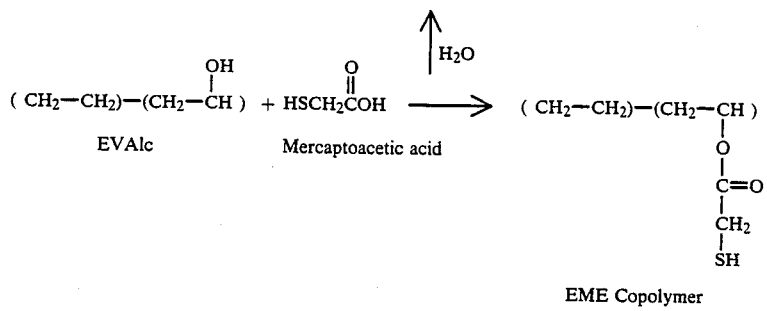

EME Copolymer

As will be discussed in the following non-limiting examples, it has been found that the EME copolymers chemically react with epoxide rings of epoxy resins and with free iron ions to form chemical links between a steel substrate and an epoxy resin. Similarly, chemical linking will also occur between the EME copolymer and a copper substrate.

EXAMPLES

A. Peel Strength

EME copolymers were synthesized from ethylene-vinyl acetate copolymers as discussed hereinabove, first by hydrolysis of acetate groups to the alcohol, followed by esterification with mercaptoacetic acid to give the mercaptoester copolymer. Peel adherends (1"×4") were cut from 4"×12" 1010 SAE 20 mil thick carbon steel plates (Q Panel) using a squaring sheet metal shear blade. The plates were wiped with a damp cloth and acetone degreased before undergoing the specific pretreatments. A diglycidyl ether of bisphenol A epoxy resin (Epon 1001, Shell Development Co.) was dissolved (40 wt % solids) in an equal weight solvent mixture of xylenes, cellosolve and MIBK prior to mixing with Versamid 115 (Miller Stephenson Chemical Co.) (80 phr) polyamide curing agent. Pressure sensitive polyethylene tape was obtained from Minnesota Mining and Manufacturing Co. Three-mil thick, 6"×5/16" bending beam adherends were cut from 1010 CRS steel foil (Precision Brand) using a sheet metal shear blade. Trimethylolpropane trithioglycolate (TTTG), 95+% low molecular weight mercaptoester coupling agent (Evans Chemetics) was used as received for the control group experiments. To provide ease of handling and insure identical treatments to every sample, the steel plates were placed in glass racks (capacity: 30 samples) prior to the pretreatment procedures. The 1"×4" steel plates were prepared for bonding by first degreasing for 15 min. in an acetone bath followed by 15 min. exposure to a 70° C., 3 wt % aqueous citric acid bath with pH adjusted to 4.0 using ammonium hydroxide. A water rinse followed by immersion for one (1) minute in a xylenes bath completed the pre-coupling agent pretreatments. All pretreatments were carried out in a nitrogen-purged glove box. The pretreatments are designed to provide a fresh oxide layer for bonding. The EME coupling agents were applied to the steel plates from solution (0.25 wt % in xylenes/methanol) at 60° C. under nitrogen. A one-min. wash in a xylenes/methanol bath was the final pretreatment step. Ellipsometry and X-ray photoelectron spectroscopy results indicated that the coupling agent thickness was approximately 50 Angstroms. Epon 1001/Versamid 115 (five-mil dry thickness) films were applied to the pretreated samples one hour after mixing at room temperature using a thin film applicator (Gardner Labs). Pretreated steel adherends were kept under an inert atmosphere until just prior to application of the epoxy film. The films were cured for 7 days in air at room temperature. Post curing for 9 hours at 80° C. was found to be necessary to remove the residual solvent and complete the crosslinking reactions. The back and sides of the samples were masked with polyethylene tape prior to 57° C. distilled water bath exposures.

Following specified water exposures, samples were scribed to a width of 0.7 in. with a razor blade and immediately tested for adhesion strength using a 90° peel test apparatus. The 90° peel test fixture was attached to the cross head of an Instron tensile test machine. The sample stage slides freely on low friction bearings, enabling the peel angle to remain at 90° as the crosshead moves downward. A TM-S Instron tensile tester equipped with either a 500 g, 2000 g or 50 lb load cell and a chart recorder was used to perform the measurements. The peel rate for all tests was 0.4 in./min. The average peel force was taken from the chart recorder output of peel force vs. debonded length. All of the peel test variables (i.e. crosshead speed, peel angle, epoxy thickness, epoxy composition) were chosen so as to eliminate as many extraneous contributions to the peel force as possible.

Table 1 shows that the initial adhesion strength was enhanced by almost an order of magnitude over the control (i.e., no polymeric coupling agent) by employing the EME 90 coupling agent. On the other hand, the more hydrophobic EME 23 coupling agent was the most successful at protecting the steel adherend from corrosion reactions. Corrosion protection was extended over a period three times as long as that achieved in the control systems.

The peel strength results in Table 1 indicate that maximum initial (dry) adhesion is obtained by incorporating a large concentration of polar reactive moieties along the polymer coupling agent backbone. However, such practice is not without its consequences. The increased hydrophilicity associated with an increase in polar group concentration reduces the ability of the coupling agent/resin system to protect the steel adherend from corrosion. The presence of an electrolyte at the steel surface is required to initiate the corrosion reactions. Apparently, water molecules can reach the steel surface in sufficient concentration to provide the necessary electrolyte, more readily when a coupling agent that is less resistant to water permeation is present in the interphase.

Table 1 also shows that adhesion tests were completed on specimens treated with a low molecular weight multifunctional mercaptoester compound (TTTG). The TTTG coupling agent contains a significantly higher concentration of mercaptoester groups by weight than EME 90. As shown in Table 1, peel specimens constructed with TTTG exhibited a greater rate of strength loss and a lesser degree of corrosion protection in the presence of hot water than those prepared using EME 90. However, this is not surprising since the TTTG interlayer is expected to be more water permeable than that of EME 90. On the other hand, the initial adhesion strength of the EME 90 samples exceeded that of the TTTG samples. This contradicts previous observations indicating that a greater concentration of reactive groups leads to greater initial adhesion strength. The ability of EME 90 to relieve, at least in part, interfacial stresses due to its visoelastic nature has been hypothesized as one reason for this contradiction. Other results based on bending beam data indicate that the EME polymeric coupling agents can reduce the interfacial stresses present in steel/epoxy adhesion systems. It is believed that the extent of stress relief achieved can significantly enhance the resulting adhesion strength.

B. Effect of Coupling Agent Thickness

Referring now to Table 2 and FIG. 1, 140 A thick coupling agent layers, steel/EME/epoxy peel specimens were prepared as described hereinabove with EME copolymers containing 23–90 wt % mercaptoester units. As observed with the 50 A thick samples of TABLE 1, the dry adhesion strengths increased and the corrosion protection decreased with an increase in coupling agent functionality. The dry strengths of the EME 47 and EME 90 samples were enhanced from 284 to 1165 g/in and 729 to 2465 g/in respectively by increasing the thickness of the coupling agent layer from 50 to 140 A. On the other hand, the degree of corrosion protection obtained did not appear to be strongly dependent on the thickness of the coupling agent used.

Figure 2:
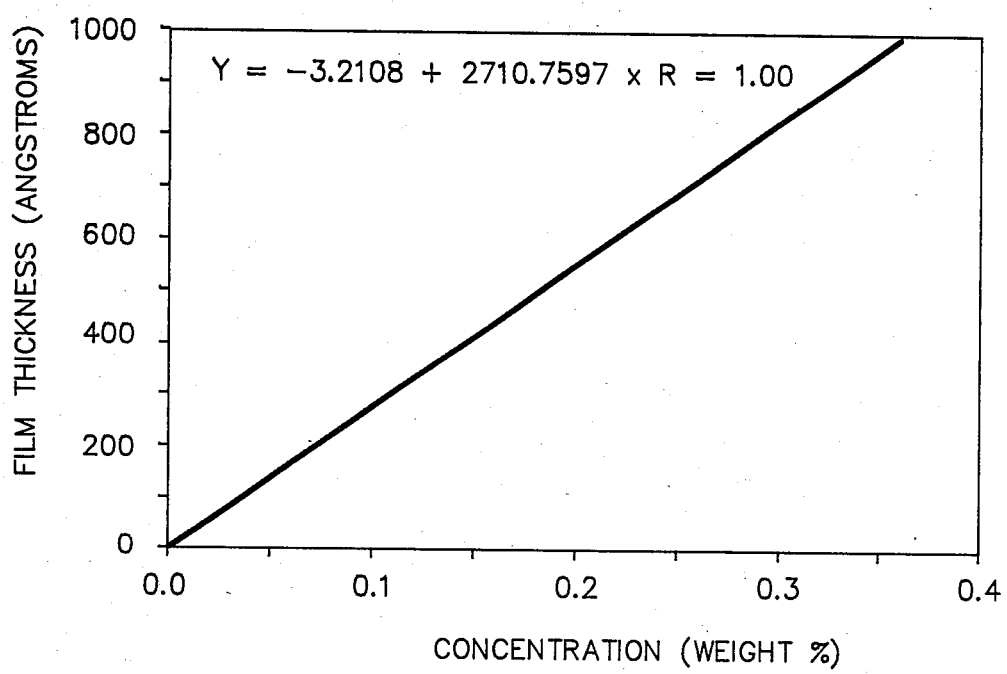
FIG. 2 is a graph showing coupling agent film thickness versus concentration.
Figure 3:
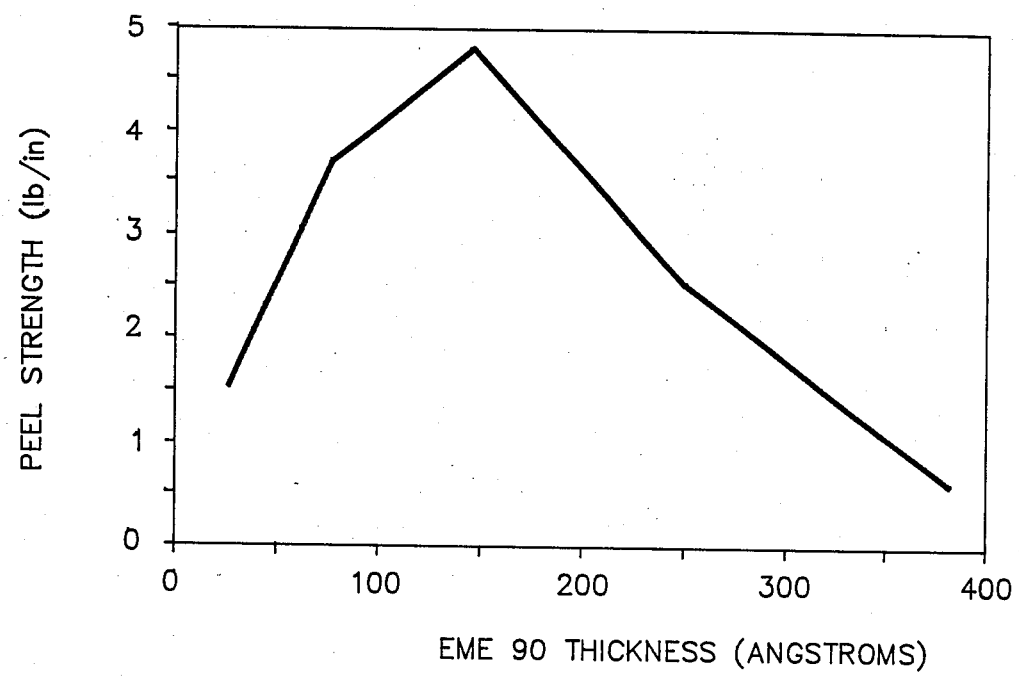
FIG. 3 is a graph showing peel strength versus coupling agent thickness.

Turning now to FIGS. 2 and 3, EME 90 solutions of various concentrations in xylenes were dip coated to 60C onto smooth steel substrates and allowed to air dry horizontally. The thickness of the resulting films were determined by ellipsometry. FIG. 2 shows that for concentrations ranging from 0 to 0.4 wt % essentially a linear relationship exists between concentration and film thickness.

Using FIG. 2 as a calibration curve, steel/EME 90/epoxy peel specimens with five different coupling agent thicknesses were prepared and tested under dry conditions. The epoxy thickness was held constant at 5 mils. The average peel strengths are plotted in FIG. 3. These data indicate that the peel strengths are quite strongly dependent on coupling agent thickness with the maximum strength of 4.9 lb/in occuring at an EME 90 thickness of approximately 140 A (average error p/m 13%).

FIG. 3 shows that EME 90 copolymer coupling agent thickness has a strong influence on the dry adhesion strength. The strength increases as the coupling agent thickness increases up to approximately 120 to 160 A, but then decreases steadily for greater thicknesses. No clear cut explanations have been developed for this behavior. However, as the coupling agent layer becomes quite thick this region can become a weak link in the adhesion system since its strength related properties will be inferior to those of the epoxy resin. The development of a weak layer is believed to be the cause of the observed drop in peel strength at large coupling agent thicknesses.

TABLE 1

| TREATMENT | PEEL STRENGTH (G/IN) IMMERSION TIME (HRS 57 C WATER) | | | | | | CORROSION PROTECTION (HRS) |
|---|---|---|---|---|---|---|---|
| | 0 | 1 | 3 | 5 | 11 | 24 | |
| CONTROL | 78 | 69 (57) | 17 (30) | 9 (24) | 4 (16) | 2 (5) | 14 |
| EME 23 | 47 | 26 (40) | 16 (31) | 11 (26) | 10 (23) | 9 (19) | 46 |
| EME 47 | 284 | 139 (196) | 47 (83) | 36 (71) | 16 (57) | 13 (44) | 32 |
| EME 90 | 729 | 319 (543) | 36 (311) | 24 (187) | 16 (66) | 11 (30) | 20 |
| TTTG | 684 | 106 (650) | 28 (180) | 11 (17) | 8 (19) | 3 (9) | 16 |

*SAMPLES DRIED 1 HR UNDER VACUUM AT 50 C

TABLE 2

| TREATMENT | PEEL STRENGTH (G/IN) IMMERSION TIME (HRS 57 C WATER) | | | | | | CORROSION PROTECTION (HRS) |
|---|---|---|---|---|---|---|---|
| | 0 | 1 | 3 | 5 | 11 | 24 | |
| EME 23 | 44 | 51 (31) | 30 (31) | 27 (32) | 23 (23) | 18 (20) | 45 |
| EME 47 | 1165 | 1400 (1565) | 255 (680) | 36 (390) | 26 (150) | 13 (41) | 21 |
| EME 90 | 2465 | 2880 (2960) | 715 (1620) | 102 (187) | 28 (180) | 11 (48) | 22 |
| CITRIC ACID | 1675 | 344 (1022) | 67 (650) | 28 (590) | 13 (20) | 3 (5) | 11 |

AVERAGE ERROR ± 12%

C. Chemical Bonding of Coupling Agent

A spectroscopic analysis of the chemical interaction between EME and iron ions was conducted to determine the nature of the bonding. UV-visible spectroscopy experiments showed that both EME copolymer and model TTTG mercaptoester containing compounds have the ability to quantitatively scavenge iron ions from solution. These results suggest the presence of a specific chemical interaction between iron ions and the mercaptoester group. IR spectra of mercaptoester-iron model systems exhibited evidence that only the thiol group of the mercaptoester was involved in the bonding. A frequency shift of the carbonyl stretching band, which would indicate coordinate bonding through the carbonyl oxygen was absent from all spectra. However, a small decrease (approx. 5–10 cm$^1$) in frequency of the carbonyl band of the TTTG—$Fe_2O_3$ spectra suggest that the carbonyl oxygens of the mercaptoester groups help to stabilize the thiol-iron coordinate bond formation.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of improving the adhesion between a metal substrate and a thermoset resin comprising the steps of:

providing a layer of a polymeric coupling agent onto the surface of a metal substrate, the polymeric coupling agent comprising a hydrophobic polymeric backbone having a plurality of functional groups attached thereto at spaced intervals along said hydrophobic polymeric backbone, said functional groups forming chemical bonds with said metal substrate and said thermoset resin;

providing a thermoset polymeric resin onto said layer of polymeric coupling agent; and curing said polymeric coupling agent and thermoset resin to chemically bond said coupling agent to said metal substrate and said thermoset resin.

2. The method of claim 1 wherein:
said polymeric backbone is selected from the group consisting of substantially alphatic or aromatic hydrocarbon polymer backbones.

3. The method of claim 2 wherein:
said hydrophobic polymeric backbone is selected from the group consisting of polyethylene or polypropylene.

4. The method of claim 1 wherein:
said functional groups are selected from the group comprising beta-diketones, mercaptoesters, benzotriazoles, benzothiazoles, amines, carboxylic acids or any combination thereof.

5. The method of claim 2 wherein:
said functional groups are selected from the group comprising beta-diketones, mercaptoesters, benzotriazoles, benzothiazoles, amines, carboxylic acids or any combination thereof.

6. The method of claim 1 wherein:
said functional groups form chemical bonds with at least one of the metal substrates steel and copper.

7. The method of claim 1 wherein:
said functional groups form chemical bonds with epoxy resins.

8. An article of construction made from the method of claim 1.

9. A method of improving the adhesion between a metal substrate and an epoxy resin comprising the steps of:
providing a layer of a polymeric coupling agent of the general formula:

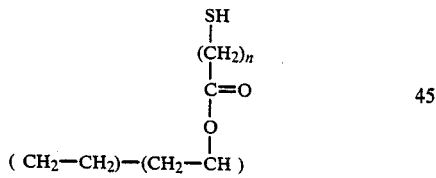

where n=1, 2 or 3 onto the surface of a metal substrate;

providing epoxy resin onto said layer of said polymeric coupling agent; and curing said polymeric coupling agent and epoxy resin to chemically bond said coupling agent to said metal substrate and said epoxy resin.

10. The method of claim 9 wherein:
said metal substrate is steel.

11. The method of claim 9 wherein:
said metal substrate is copper.

12. An article of construction made by the process steps of claim 9.

13. An article of construction comprising:
a metal substrate;
a layer of a polymeric coupling agent on a surface of said metal substrate, said polymeric coupling agent comprising a hydrophobic polymeric backbone having a plurality of functional groups attached thereto at spaced intervals along said hudrophobic polymeric backbone, said functional groups forming chemical bonds with said metal substrate and a thermoset polymeric resin; and
a thermoset polymeric resin on said layer of polymeric coupling agent wherein said polymeric coupling agent chemically bonds said thermoset resin to said metal substrate.

14. The article of claim 13, wherein:
said polymeric backbone is selected from the group consisting of substantially alphatic or aromatic hydrocarbon polymer backbones.

15. The article of claim 14 wherein:
said hydrophobic polymeric backbone is selected from the group consisting of polyethylene or polypropylene.

16. The article of claim 13 wherein:
said functional groups are selected from the group comprising beta-diketones, mercaptoesters, benzotriazoles, benzothiazoles, primary amines, carboxylic acids or any combination thereof.

17. The article of claim 14 wherein:
said functional groups are selected from the group comprising beta-diketones, mercaptoesters, benzotriazoles, benzothiazoles, primary amines, carboxylic acids or any combination thereof.

18. The article of claim 13 wherein:
said functional groups form chemical bonds with at least one of the metal substrates steel and copper.

19. The method of claim 13 wherein:
said functional groups form chemical bonds with epoxy resins.

20. An article of construction comprising:
a metal substrate;
a layer of a polymeric coupling agent of the general formula:

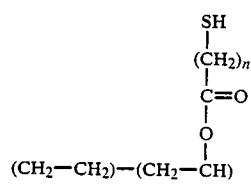

where n=1, 2 or 3 on a surface of said metal substrate; and epoxy resin on said layer of said polymeric coupling agent wherein said polymeric coupling agent chemically bonds said epoxy resin to said metal substrate.

21. The article of claim 20 wherein:
said metal substrate is steel.

22. The article of claim 20 wherein:
said metal substrate is copper.

* * * * *